United States Patent
Tracy et al.

[19]

[11] Patent Number: 6,150,955
[45] Date of Patent: Nov. 21, 2000

[54] APPARATUS AND METHOD FOR TRANSMITTING DATA VIA A DIGITAL CONTROL CHANNEL OF A DIGITAL WIRELESS NETWORK

[75] Inventors: Michael J. Tracy, Scottsbluff; Robert L. Hinze, Gering, both of Nebr.

[73] Assignee: Tracy Corporation II, Scottsbluff, Nebr.

[*] Notice: This patent issued on a continued prosecution application filed under 37 CFR 1.53(d), and is subject to the twenty year patent term provisions of 35 U.S.C. 154(a)(2).

[21] Appl. No.: 08/740,361

[22] Filed: Oct. 28, 1996

[51] Int. Cl.⁷ .................................................. G08B 23/00
[52] U.S. Cl. ............................... 340/870.02; 340/870.03; 379/106.03; 455/426; 455/466; 370/349; 370/474
[58] Field of Search .................... 340/870.02, 870.03, 340/870.07; 455/910, 33.1, 426, 466; 379/106, 56.3, 106.03, 59, 74, 63; 375/200; 370/328, 349, 474, 522, 524; 702/61, 62; 348/6

[56] References Cited

U.S. PATENT DOCUMENTS

| | | | |
|---|---|---|---|
| 3,566,384 | 2/1971 | Smith et al. | 340/200 |
| 3,778,771 | 12/1973 | Whitaker | 340/150 |
| 4,008,458 | 2/1977 | Wensley | 340/151 |
| 4,022,977 | 5/1977 | Nomura | 179/2 AM |
| 4,035,772 | 7/1977 | Abe et al. | 340/151 |
| 4,135,181 | 1/1979 | Bogacki et al. | 340/310 A |
| 4,296,411 | 10/1981 | Romanelli et al. | 340/870.02 |
| 4,315,251 | 2/1982 | Robinson et al. | 340/310 A |
| 4,394,540 | 7/1983 | Willis et al. | 179/2 AM |
| 4,396,915 | 8/1983 | Farnsworth et al. | 340/807.03 |
| 4,415,853 | 11/1983 | Fisher | 324/74 |
| 4,491,793 | 1/1985 | Germer et al. | 324/157 |
| 4,538,029 | 8/1985 | Gazzoli et al. | 179/2 |
| 4,630,211 | 12/1986 | Pettis | 364/464 |

(List continued on next page.)

OTHER PUBLICATIONS

Evans, "Cellemetry® Data Service—Telemetry Via Cellular", pp. 1–9, 1998 Cellemetry LLC.

Sensese et al., "GSM Handset Vulnerabilities, Part II: Physical Layer Protocol", pp. 26–32, Communications Systems Design, Aug. 1998.

Mouly et al., "An Introduction to GSM", Northern Telecom, Inc., 1993.

Mouly et al., "The GSM System for Mobile Communications", 1993, pp. 300–306 and 556–565.

*Primary Examiner*—Michael Horabik
*Assistant Examiner*—Albert K. Wong
*Attorney, Agent, or Firm*—Sheridan Ross P.C.

[57] ABSTRACT

A system for remotely monitoring and transmitting data and other information received from utility and other devices is disclosed. The universal meter reader of the present invention includes a device for sensing and collecting data at a first location. The sensed data that is in analog form is converted to a digital signal and a processing unit processes the data. The data is subsequently stored in a memory device for subsequent transmission to an interested party. In one embodiment, the data can be digitally transmitted over a GSM or TDMA technology digital network via a control channel. In addition, the universal meter reader includes a connective interface for connecting to a telecommunications system at a first location to establish a wireless telecommunications connection. An improved infrared reader of the present invention includes an infrared transmitter and receiver. A reflective member is displaced between the transmitter and the receiver and creates an optical communication with the rotatable disk, dial or mechanical indicator located within a conventional utility meter. The improved meter is capable of measuring the number of disk, dial or mechanical indicator rotations and is also capable of calculating and storing utility usage from the number of disk rotations. The data is then capable of being transmitted via a wired or wireless connection to the universal meter reader or a display unit.

29 Claims, 5 Drawing Sheets

U.S. PATENT DOCUMENTS

| | | | |
|---|---|---|---|
| 4,720,851 | 1/1988 | Smith | 379/107 |
| 4,749,992 | 6/1988 | Fitzemeyer et al. | 340/870.02 |
| 4,803,632 | 2/1989 | Frew et al. | 364/464.04 |
| 4,833,618 | 5/1989 | Verma et al. | 364/483 |
| 4,856,054 | 8/1989 | Smith | 379/107 |
| 4,940,976 | 7/1990 | Gastouniotis et al. | 340/870.02 |
| 5,010,568 | 4/1991 | Merriam et al. | 397/107 |
| 5,014,213 | 5/1991 | Edwards et al. | 364/483 |
| 5,161,182 | 11/1992 | Merriam et al. | 397/107 |
| 5,214,587 | 5/1993 | Green | 364/464.04 |
| 5,481,546 | 1/1996 | Dinkins | 370/95.1 |
| 5,526,403 | 6/1996 | Tam | 379/59 |
| 5,544,227 | 8/1996 | Blust et al. | 379/63 |
| 5,546,444 | 8/1996 | Roach, Jr. et al. | 379/59 |
| 5,548,631 | 8/1996 | Krebs et al. | 379/58 |
| 5,553,094 | 9/1996 | Johnson et al. | 375/200 |
| 5,576,700 | 11/1996 | Davis | 340/870.02 |
| 5,594,740 | 1/1997 | LaDue | 455/910 |
| 5,668,538 | 9/1997 | Warwick | 340/870.03 |
| 5,675,371 | 10/1997 | Barringer | 455/466 |
| 5,845,203 | 12/1998 | LaDue | 455/466 |

APPARATUS AND METHOD FOR TRANSMITTING DATA VIA A DIGITAL CONTROL CHANNEL OF A DIGITAL WIRELESS NETWORK

FIELD OF THE INVENTION

The present invention relates generally to the remote monitoring of usage information, and in particular to an apparatus and associated method for transmitting, receiving, storing, processing and digitally re-transmitting the information directly to a remote receiving device via various methods to include Personal Communications Systems (PCS) using Global Standards for Mobile Communications (GSM) or Time Division Multiple Access (TDMA) Technology.

BACKGROUND OF THE INVENTION

Presently, many utility meters are monitored by having an employee visually inspect each meter, and record the usage data. Several methods and devices have been proposed to automatically collect the utility usage data thereby reducing the labor involved in collecting the utility usage data.

In U.S. Pat. No. 4,803,632, Frew, et al. disclose a device for monitoring utility usage. The device is independently powered and is capable of short range infrared transmission of the utility usage data. A wand is also provided that is capable of receiving the transmitted data. A meter-reading employee uses the wand by placing it close to the monitoring device to receive the data which is electronically stored in a transportable unit carried by the employee. The employee then brings the electronically stored data to the utility company where it is downloaded from the transportable unit and used to calculate the customer's utility usage bill.

U.S. Pat. Nos. 5,010,568 and 5,161,182, by Merrian, et al. disclose a utility usage monitor that connects to the customer's telephone line via a modem. The usage monitor calculates and stores the customer's utility usage data. The utility company periodically calls the monitoring unit, and when a modem connection between the utility company and the monitoring unit is established, the monitoring unit sends the usage data to the utility company and the data is used to calculate the customer's usage bill.

In U.S. Pat. No. 4,940,976, Gastouniotis, et al. disclose a device that monitors utility usage data. The customer's utility usage data is collected by a unit located in the customer's residence. The monitoring unit sends the usage data via a radio frequency to an intermediate storage station where usage data from to 10,000 residences is capable of being stored. Periodically, the intermediate station sends the stored data to the utility company by either a radio frequency link, a cable TV line or telephone line. Subsequently, the utility usage data is used to calculate the customer's bill.

A need exists for a system that is capable of monitoring utility usage and other information on varying reading schedules and different levels of frequency of data interrogation (profiling), and is capable of wirelessly transmitting digital data to a desired remote device.

Accordingly, it would be advantageous to provide a data collection device that receives information from utility meters and other devices.

It would further be advantageous to provide for digital transmission of the information to a remote receiving device, and in one embodiment the information should be capable of being transmitted via GSM or TDMA digital technology operating at any frequency.

It would also be advantageous for the data collection device provide an interface with telecommunications wiring at a location so as to provide a connection to a cellular, PCS or equivalent wireless network.

It would be advantageous to provide an improved infrared meter reading device for use with utility meters having a rotatable disk, dial or mechanical type indicator where the improved reader is capable of being attached to an existing meter without having to retrofit the meter.

SUMMARY OF THE INVENTION

According to the present invention, an apparatus is provided for automatically collecting data and digitally transmitting that data to a remote receiving device, and the data is capable of being transmitted in one embodiment using GSM or TDMA digital technology. The apparatus includes a device for sensing and collecting data at a first location. If the sensed data is analog, then the analog data is converted to digital data. The collected data may be transmitted to a data collection device for storage and/or processing before the data is digitally transmitted to the desired remote device. Within the data collection device is a device for processing and storing which is also used to convert and encode the data into a desired format and electronically store the data. The device for processing and storing can include a central processing unit (CPU) for processing the collected data, erasable programmable memory (EPROM) for storing a program to process the collected data and random access memory (RAM) for storing the data before it is transmitted.

Periodically, or when prompted by an interested party, the apparatus transmits the digital data to a remote receiving device via a telecommunications unit and network using GSM or TDMA digital technology on any radio frequency. The GSM or TDMA network transmits the stored and/or processed data on a digital GSM or TDMA control channel and the data is delivered to the remote receiving device. In one embodiment, the apparatus is capable of transmitting the data over the Personal Communications System (PCS) network utilizing frequencies of about 1900 Mhz.

Although the present invention is described in relation to PCS networks using GSM or TDMA technology, it should be appreciated that the present invention may be used in conjunction with any other wireless system that employs the use of a digital control channel to transmit information to a remote receiving device.

In another embodiment, the apparatus for automatically collecting data can be connected via a connecting device to a user's telecommunications system (e.g., existing hard-wired telephone system) to create a connection to a wireless telecommunications network (e.g., GSM, TDMA or Code Division Multiple Access (CDMA) network). Thus, a connection in this manner allows for voice or data transmission over the wireless telecommunications network using the existing telecommunications wiring at a location.

In another aspect of the invention, an improved utility monitoring optical/infrared reader is provided for transmitting and receiving an optical/infrared signal. The improved reader may be used to determine a customers utility usage from a conventional utility meter having a rotatable disk, dial or mechanical type indicator without having to alter the existing meter.

In one embodiment, a reflecting device is positioned between an optical/infrared transmitter and the receiver. The reflecting device optically couples a rotating disk, dial or mechanical type indicator located inside a utility meter with the transmitter and receiver. In another embodiment, the reflecting device comprises two mirrors. In addition, a calculating device is provided that calculates a number of rotations of the rotating disk, dial or mechanical type indicator and a processing device is used to convert the number of rotations into meter usage data. A monitor can be provided for visually displaying the utility data to an observer. The meter usage data can be electronically stored within the meter reading device. In addition, the data can be subsequently transmitted to another location via a wired or wireless connection. The wireless transmission of the data may be sent over a frequency band that has not been licensed for commercial use. The transmitted data is capable of being received by the universal meter reader and subsequently digitally transmitted.

DETAILED DESCRIPTION

One aspect of the invention is directed to an automatic meter reading apparatus for collecting and transmitting utility usage and other information. The universal meter reader collects data from utility meters and other devices, and the data can be transmitted to the universal meter reader via a wired or wireless connection. Within the universal meter reader is a wireless transmitter/receiver that is capable of digitally transmitting the data to a remote device, such as to a utility company over a Personal Communications System (PCS) using GSM or TDMA technology and receiving data from the remote device. The remote device is capable of interrogating individual universal meter readers because the wireless telecommunications technology allows each individual universal meter reader to have an unique address. Another aspect of the present invention is directed to an improved meter reading device that has an increased depth of focus. The improved reader includes an electromagnetic radiation (e.g. optical or infrared) transmitter and receiver. In addition, a device for reflecting an electromagnetic beam is provided such that the beam is optically coupled between the transmitter, receiver and a rotatable disk, dial or mechanical type indicator provided in a utility meter. The improved meter reader is capable of being integrated into existing meters without having to replace each existing utility meter.

Figure 2:
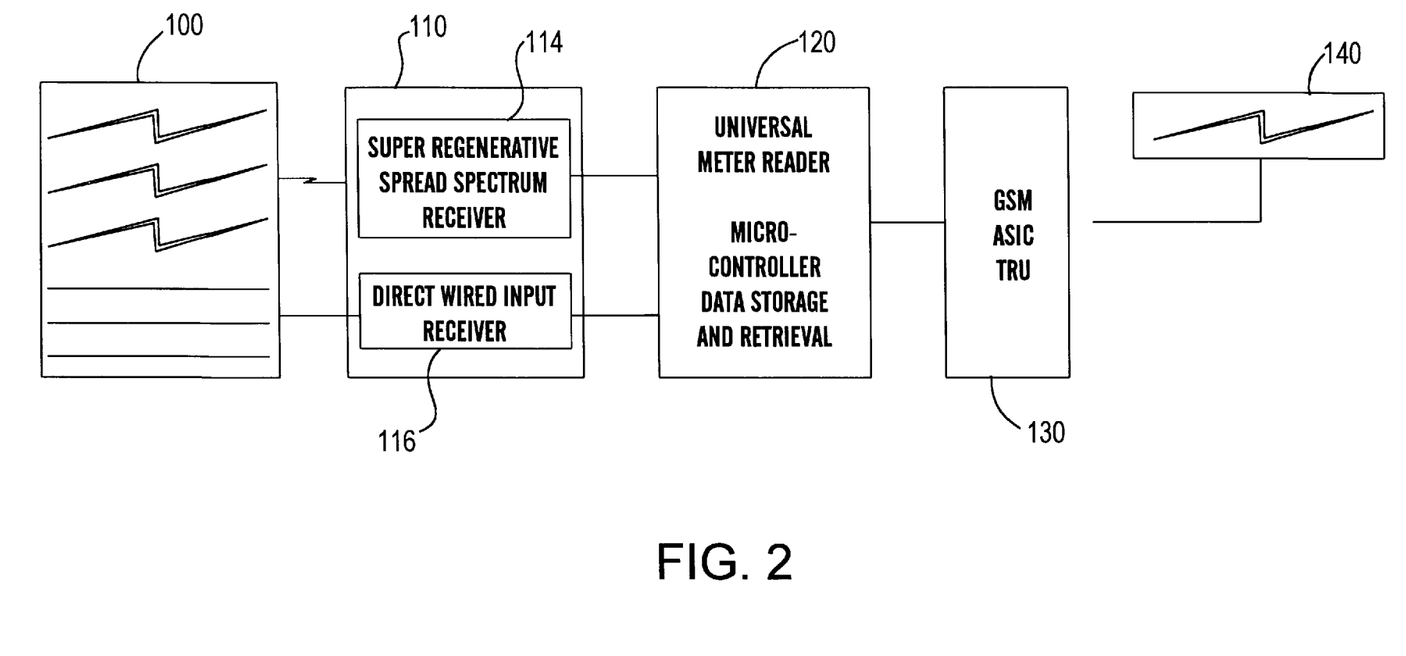
FIG. 2 is a block diagram of another embodiment of a universal meter reader.

In FIG. 2, a block diagram of an universal meter reader includes a data collection receiver 110 that is connected to meters or other devices 100. The data collection receiver 110 includes a direct wired input receiver 116 for those meters or other devices 100 that are directly wired to receiver 110, and a super regenerative or spread spectrum receiver 114 is included for those meters or devices 100 that are wirelessly connected to receiver 110. A universal meter reader 120 is connected to data collection receiver 110 and is capable of calculating and storing meter usage data from any presently existing meter readers or other devices. Also, a GSM or TDMA telecommunication unit 130 is connected to the universal meter reader 120 such that the data received from the meters 100 is capable of being digitally transmitted over a GSM or TDMA digital technology network control channel to a remote device or location 140.

In one embodiment, the universal meter reader can be miniaturized and located behind an electrical meter. This embodiment contains a transceiver that is capable of transmitting and receiving information over a digital GSM or TDMA network. In addition, this embodiment can also contain a receiver for collection of data from wireless meter readers associated with the universal meter reader.

Figure 3:
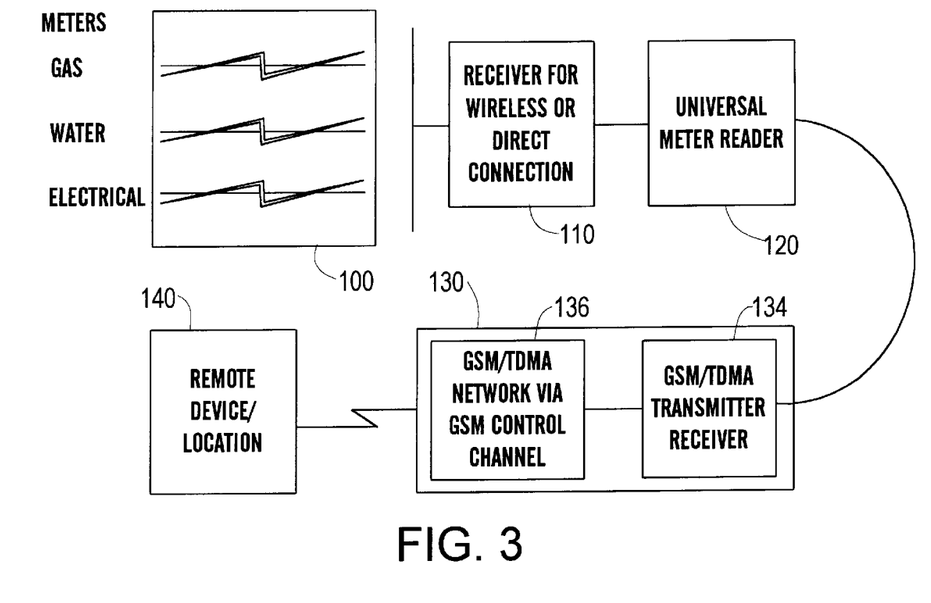
FIG. 3 is a block diagram of an universal meter reader.

Referring to FIG. 3, the GSM or TDMA telecommunications unit 130 includes a GSM or TDMA transmitter/receiver 134 that receives data from the universal meter reader 120. The GSM or TDMA transmitter/receiver is then capable of digitally transmitting data to and from a remote receiving device 140 via the GSM or TDMA network control channel 136. The PCS network contains spectrum assignments between 1850 to 1990 Mhz (referred to herein as the 1900 Mhz bandwidth). In a preferred embodiment, the GSM or TDMA transmitter operates over a frequency range of 1850 to 1990 Mhz. It should further be appreciated that the universal meter reader of the present invention may be used in conjunction with any wireless network that employs a digital control channel for transferring information. In addition to existing wireless network technologies such as PCS, GSM, TDMA, CDMA, Frequency Division Multiple Access (FDMA) and Personal Access Communications System (PACS), the present invention is envisioned to be used in connection with other wireless network technologies that may be developed and that employ the use of a digital control channel to transfer information.

Figure 1:
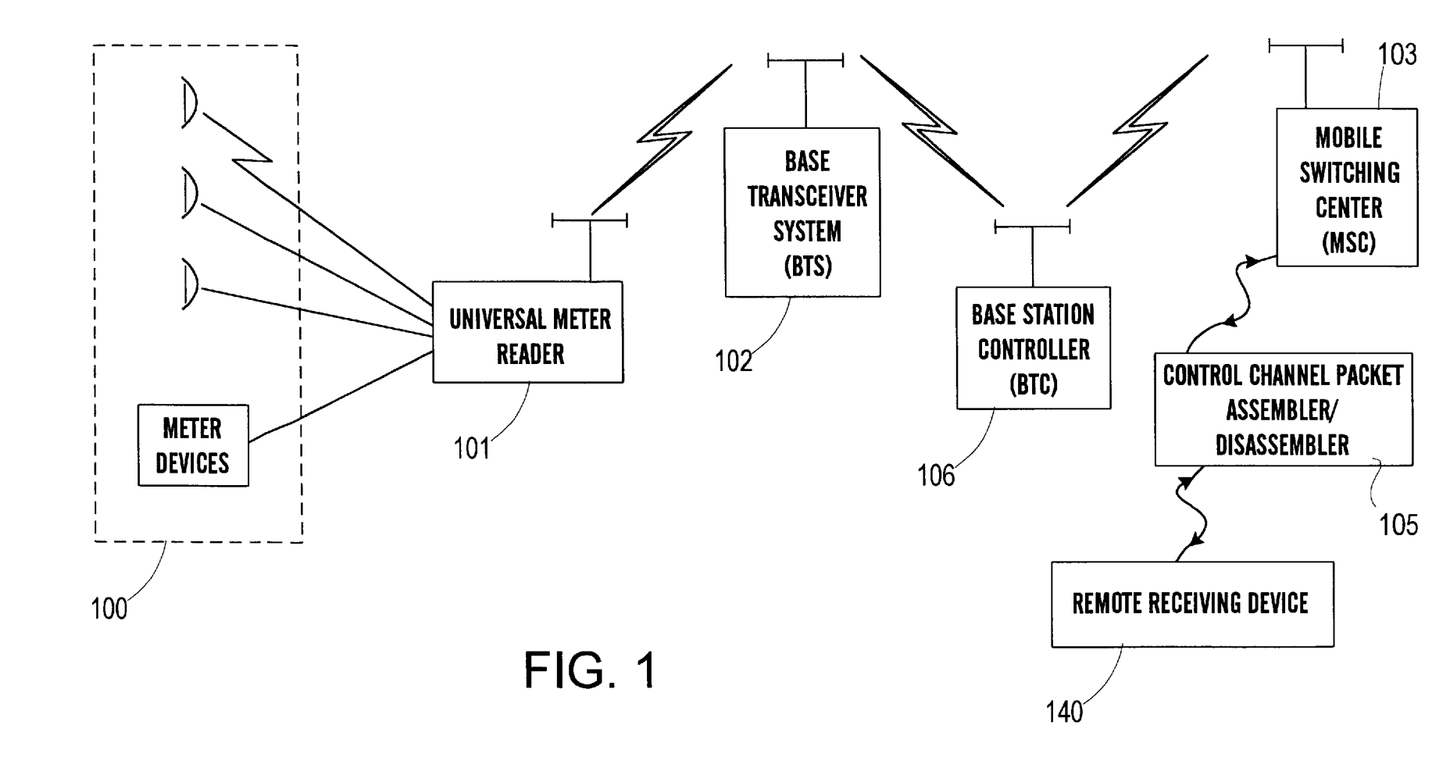
FIG. 1 is a block diagram of one embodiment of a universal meter reader.

Referring to FIG. 1, the data from all of the meters 100 is transmitted to the universal meter reader 101, for example by a wired or radio frequency connection. The universal meter reader 101 is also capable of receiving data from meters that have been manufactured by various companies. The data from the universal meter reader 101 is transmitted over a network infrastructure to a base transceiver system (BTS) 102 using a digital control channel. From the BTS 102, the data is transmitted to a base station controller (BSC) 106. Then from the BSC 106, the data is transmitted to a mobile switching center (MSC) 103. A control channel packet assembler/disassembler 105 is physically located at the MSC 103. At this location, the data stream is transmitted in a common data format (e.g., Integrated Services Digital Network (ISDN), etc.) Data is transmitted over the control channel in continuous transmission units. Each transmission unit contains a specific number of data packets (e.g., under PCS wireless networks there are five data packets per transmission unit). Since the control channel is generally under utilized, many of the data packets contain no wireless network transmission information, such packets are known as "dummy" packets.

The control channel packet assembler/disassembler 105 continuously monitors the data steams and can separate the control channel data packets necessary for system control or other system information from other channel data packets with other characteristics. To this end, it should also be appreciated that although the control channel assembler/disassembler 105 is physically located at the MSC 103, it may be logically located at any point between the ETS 102 and the MSC 103. Each data packet has a "header" which contains a specific numeric configuration which identifies a packet as a "dummy" packet, GSM control packet or a specific data packet. Specific data packets transferred to and from the universal meter reader 101 are detected by the control channel packet assembler/disassembler 105, "stripped", interrogated, quantified and simultaneously replaced by a "dummy" packet which is, then, transmitted to the MSC 103. The "stripped" packets that contain information from the universal meter reader 101 may be transmitted to the remote receiving device 140 to be processed. Conversely, instructional information for the universal meter reader 101 may be transferred from the remote receiving device 140 to the control channel packet assembler/disassembler 105 and introduced into the control channel by stripping a dummy packet and inserting a control data packet with the instructional information in the data stream. The instructional information is transmitted back to the universal meter reader 101 via the MSC 103, BSC 106 and the BTS 102. Accordingly, the control channel packet assembler/disassembler 105 is operated in tandem on both the inbound and outbound control channels between the BSC 106 and the MSC 103. In one embodiment, the control channel packet assembler/disassembler 105 can be a computer that has been programmed to perform the functions mentions hereinabove.

More specifically, the present invention utilizes removal of the "dummy" packets that contain no information and replacing these packets with diverted data packets. The diverted data packets can contain data and instructions that are used by the remote device to control the individual universal meter readers. In addition, the diverted data packets can contain data that the universal meter reader sends to the remote device. The diverted data packets can be diverted between the BTS 102 and the MSC 103. The diverted data packets are replaced with "dummy" data packets making the operation of this system transparent to the MSC 103. Operating in this manner, the remote receiving device 140 and the universal meter reader 101 create a two way communications link.

Under the GSM or TDMA technology, there are 8 logical channels per radio frequency channel which are available for communication of which 7 channels are used for voice/data transmission and 1 channel is used as a control channel. The control channel is normally used by the GSM or TDMA network to verify the caller's identification and billing information. In addition, the control channel is used for switching the caller between communication towers typically when the caller is close to becoming out of the range of a transmitting tower. As such, there are times when the control channel is not in use by the digital GSM or TDMA communications network. During this non-use time, the universal meter reader 101 is capable of transmitting data over the network system without interfering with other control channel transmissions. In the present invention, the GSM and TDMA control channel is always fully in use with streams of data packets, but the majority of the data packets consist of "dummy" data packets, as explained hereinabove. The "dummy" packets can be "stripped" from the data stream in route to the BTS 102. The packets that are "stripped" are replaced with dummy data packets that contain address and instruction for the universal meter reader 101. The address information contains a unique address for each individual universal meter reader. Therefore, the present invention is capable of communicating with individual universal meter readers because information may be sent to the unique address of the desired universal meter reader. The diverted data packets which are received via the GSM or TDMA ETS 102 are stripped and not forwarded to the MSC 103. This packet "stripping" allows this system to be installed without software modification to the home location register (HLR), vehicle location register (VLR) or MSC 103. As such, the universal meter reader 101 is capable of transmitting or receiving data at any prescribed or requested time. Thus, data can be transmitted or received at times when other control channel transmissions are at a minimum. Data transmitted over the control channel is digital, and therefore the digital data from the universal meter reader 120 may be transmitted over the GSM or TDMA network, and therefore removing the need of a digital-to-analog conversion.

Existing meter interrogation systems are not intelligent and cannot interrogate individual or specific devices. Such systems, through the network transmission system, issue a command to all meters in a certain portion of the network to report. Those zoned meters then transmit data on a sequential (timed) basis. The meters receive this command and then report the data via the wireless network multiple times, independent of any other readings which might be taking place at this same time. This operational theory assumes that the meters' data transmissions will not interfere with each other through this staggered interrogation and transmission scheme, and that one of the multiple readings (if not more) will reach the data collection point in an uncorrupted manner.

In the present invention, the universal meter reader transmits data when requested to do so by the GSM or TDMA signal. Therefore, it is possible to read single meters without activating all of the meters in a zone to do so. This operation of interrogating meters decreases the amount of traffic on the GSM or TDMA control channels and optimizes the efficiency of the system operation.

Figure 4:
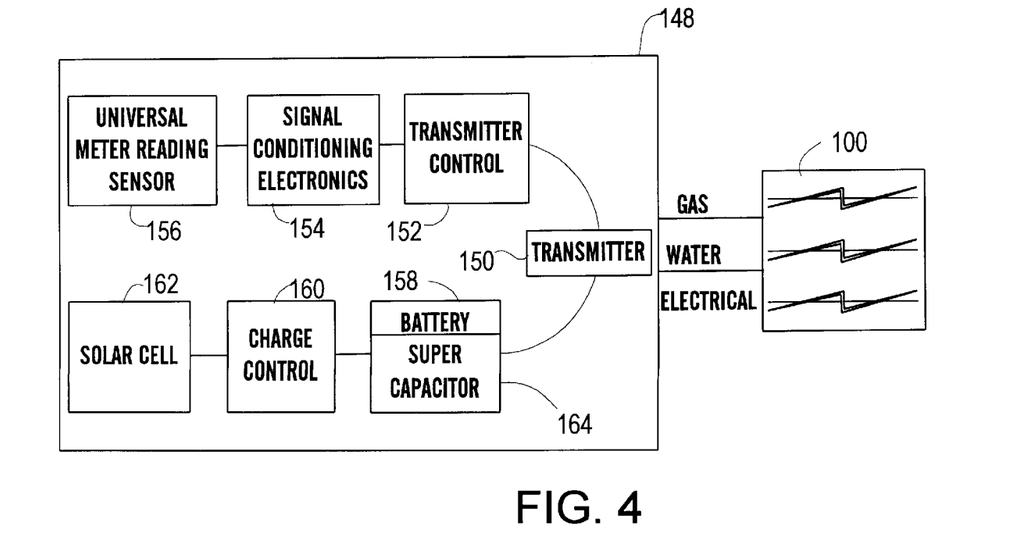
FIG. 4 is a block diagram of a remote meter reader.

Referring to FIG. 4, the meters or other devices 100 may be remotely located from the universal meter reader 120 (see FIGS. 3 and 5) and connected by a wireless data collection unit 148. The data that is collected from meters or other devices 100 is capable of being processed and stored by the universal meter reading sensor 156. The data is conditioned and preferably encrypted before transmission using signal conditioning electronics 154. Periodically, the transmitter control 152 directs the transmitter 150 to send the data to the super regenerative or spread spectrum receiver 114, shown in FIG. 2. The transmitter 150 is capable of operating on unlicensed radio frequencies, such as 27, 49, 300 or 902–928 Mhz using either frequency modulation (FM) or amplitude modulation (AM). Preferably, the transmitter 150 will operate over the frequency range of 902–928 Mhz using amplitude modulation.

The transmission of the data from the transmitter 150 to the universal meter reader 120 (shown in FIG. 2) can be accomplished by using an inductive (L) and capacitive (C) super regenerative circuit, described in detail hereinbelow. The LC circuit is a fairly inexpensive alternative for short distance wireless transmission of data. After the data is sent to the LC receiver 114 (shown in FIG. 2), it may be sent to a remote device or location, as explained hereinabove, using the GSM or TDMA telecommunications unit 130, also shown in FIG. 2.

As shown in FIG. 4, the wireless data collection unit 148 can be remotely powered by a battery 158 that can be charged by a solar cell 162. The charge control unit 160 regulates the power from the solar cell 162 such that battery 158 and super-capacitor 164 are charged. In the event of power loss, the super-capacitor 164 may be used as a backup power source. In another embodiment, the wireless data collection unit is powered by long life batteries.

Figure 5:
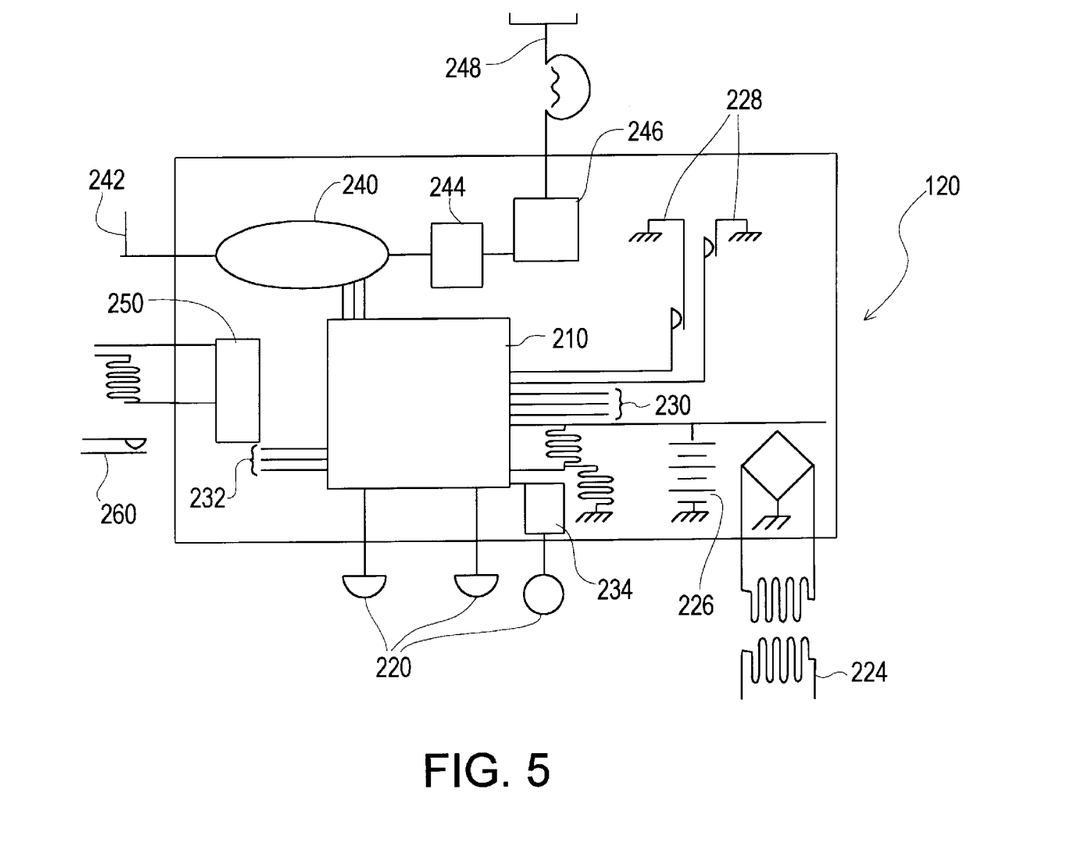
FIG. 5 is a block and schematic diagram of an embodiment of the universal meter reader.

Referring to FIG. 5, the universal meter reader 120 further includes a data collection unit 210. In one embodiment, the data collection unit 210 includes a central processing unit (CPU) that has an electronic memory such as erasable programmable read-only memory (EPROM) and a real-time clock. These devices are used to store, time stamp and process the most recent meter output or other data. The data processing program/algorithm that is used by the CPU to process the utility data is stored in the EPROM via program data lines 230, and for security purposes, after initially programming the CPU, the data processing program/algorithm cannot be changed. In the event that the data, the algorithm or any physical part of the universal meter reader 120 itself is tampered with, the universal meter reading 120 is capable of detecting the false data or algorithm or physical intrusion and can send a security breach signal to the remote receiving device (e.g., the utility company computers).

The CPU has a plurality of data input and output (I/O) lines. Therefore, the I/O lines that are not in use by the utility devices may be used for additional applications. For example, the additional lines may be connected to a home security unit having a number of sensors throughout the home. When a sensor detects an intrusion, the universal meter reader 120 is capable of transmitting that breach to a remote device located, for example, at a police station. Other home applications include a home health monitoring device that can be capable of detecting the health status of an invalid and transmit that data to a hospital.

In another embodiment, the universal meter reader may use additional I/O lines to monitor the usage of vending machines or the like. For example, each vending machine located in a building can be capable of transmitting its usage data to the universal meter reading which, in turn, transmits that usage data to the vending company. Therefore, the vending company can restock the vending machines without wasting manpower by having to manually check each machine. The invention also encompasses applications for irrigation sprinkler systems monitoring and control, oil well monitoring and control, sewage/water monitoring at industrial sites, smokestack emissions monitoring, real-time monitoring of air quality in metropolitan areas, remote weather monitoring and power failure location monitoring.

The utility usage data is obtained from meters 220, and additional data lines 232 are available for monitoring other devices. Meters 220 may be hard-wired or wirelessly connected to the data collection unit 210. When the meters 220 are wirelessly connected, the data is preferably transmitted over unlicensed frequency bands, preferably over the frequencies of 27, 49, 300 or 902–928 Mhz.

The costs associated with the universal meter reader cost are reduced through the use of a non-invasive, field installed optical meter reader described hereinbelow. The universal meter reader, is capable of reading multiple status and usage inputs compared to other devices which read each device as an individual element. The universal meter reader conditions the data through the CPU to provide a more efficient usage of technology and spectrum. In addition, the universal meter reader can interface to many devices with wired or wireless media and inputs.

When using wireless collection between the universal meter reader and meters being read at a given site, the receivers and transmitters are extremely low in cost, low in technical criteria and are similar to keyless entry systems. The security and reliability of this low cost system is achieved through CPU error checking in the universal meter reader. Data from a wireless meter is periodically transmitted multiple times on a variety of closely spaced, unlicensed radio frequencies. The CPU in the universal meter reader controls a low cost LC super regenerative receiver to rapidly sequence through the frequencies seeking a valid signal to lock to. When the signal is received and locked, the CPU inspects the data for errors and wireless meter reader serial number prior to accepting and storing the data (in this example a meter reading) for storage and later transmission via the GSM or TDMA system to the data collection point.

Furthermore, the universal meter reading system is low cost because it utilizes the modification of existing meter infrastructure and simply adds an optical/infrared reader which is much less costly than replacing an installed meter with a meter equipped with reading electronics contained therein. Further, multiple meters and alarms are read at one site by one universal meter reader. As explained earlier, through the utilization of the GSM or TDMA control packet data collection system, there are no software modifications necessary to any of the GSM or TDMA transmitting or receiving equipment.

As explained above, the transmission of data from the meters 220 to the data collection unit 210 may be accomplished by using an LC super regenerative circuit to create a wireless connection between the unit 210 and the meters 220. In addition, when the meters 220 are wirelessly connected, signal conditioning electronics 234 are used to filter any electromagnetic noise in the transmitted signal. The signal conditioning electronics 234 may also be used when the meters 220 are hard-wired to the connection unit 210 in order to filter noise and deliver a clean logic signal to the data collection unit 210.

Also shown in FIG. 5, opto-triac switch 250 is used for controlling the coil of the load shedding relay contacts 260. The opto-triac is a commercially available device used to isolate sensitive electronic devices from transient surges caused by switching large power loads. One or more load shedding relays 260 may be controlled which allows the utility company to shut down power to areas having low usage priority in the event of a power outage or high usage times. For example, a customer may reach an agreement with the utility company to cut the power to his home during a "brown out" period such that the additional energy may be used to power a nearby hospital. The load shedding relay 260 is capable of being activated by the utility company over the network to the universal meter reader 120 because the GSM/TDMA communications link is capable of two-way communication. In addition, a power wheeling device may be attached to universal meter reading 120. The power wheeling device would allow the utility consumer to compare the utility rates of various utility companies in the area. If the consumer finds a more competitive utility rate, the consumer is capable of switching to that utility company by using the power wheeling device and the universal meter reading 120.

In one embodiment, the universal meter reading 120 is located in an extension to an existing electric meter, but the universal meter reader 120 may be housed and mounted in a separate waterproof unit. In either case, the universal meter reader 120 can powered by an AC voltage obtained from the customer's utility power line. The AC voltage is stepped down by power electronics 224 where, preferably, a voltage signal of about 8 volts is produced. A battery backup 226 is provided when the AC power source is not capable of providing power to the universal meter reader 120. Preferably, the battery backup 226 is a gel cell battery having a long battery life. Also provided, with the universal meter reader 120, are security switches 228 that detect when the unit is tilted or when the cover to the unit is opened. When the security switches 228 are triggered, the data collection unit 210 is capable of reporting a security breach to the remote device 140, as shown in FIG. 3, over the communications network.

When the data has been processed by the data collection unit 120, it is then sent over the network using GSM or TDMA communications electronics 234 that are connected to the data collection unit 210 and an antenna 242. The GSM or TDMA communications electronics 234 allows data to be transmitted to the data user's facility over the control channel of a GSM or TDMA network. As explained earlier, the communications connection over the network is a two-way link which allows data to be sent to and from the remote device or location and the universal meter reading unit 120. As such, the interested party may communicate with the universal remote reader 120 to access data or other features (e.g., load shedding and power utilizing).

Referring to FIG. 5, the universal meter reader can also be connected to a telecommunications system wiring at a user's location 248 (e.g., the existing telephone wiring in a house) to create a connection to a wireless telecommunications network, such as a GSM or a TDMA network. As such, as shown in FIG. 5, a vocoder 244 and ring/tone generator 246 located within the universal meter reader 120 are connected to the existing telephone wiring 248. The ring/tone generator 246 is provided to create dial tone and ringing capabilities to the existing telephone wiring from the wireless telephone network. The vocoder 244 is used to convert voices to digital signals which are capable of being transmitted over the wireless network. This wireless telecommunications network connection replaces the need for wired telecommunications service because it established a wireless telecommunications interface at the location through the universal meter reader 120. In addition to providing wireless telephone service over the existing telephone wiring, the universal meter reader is capable of simultaneously performing all the functions described hereinabove.

Additionally, a method for collecting and transmitting data from the universal meter reading unit 120 is provided. First, analog and digital data is sensed at a first location. The analog data is subsequently converted into digital data. The digital data is processed into a desired format and is stored in a memory device. The processed digital data is transmitted over a wireless network to a remote device or location. In another embodiment, the transmission step is made over a wireless network control channel using GSM or TDMA digital technology.

Figure 6:
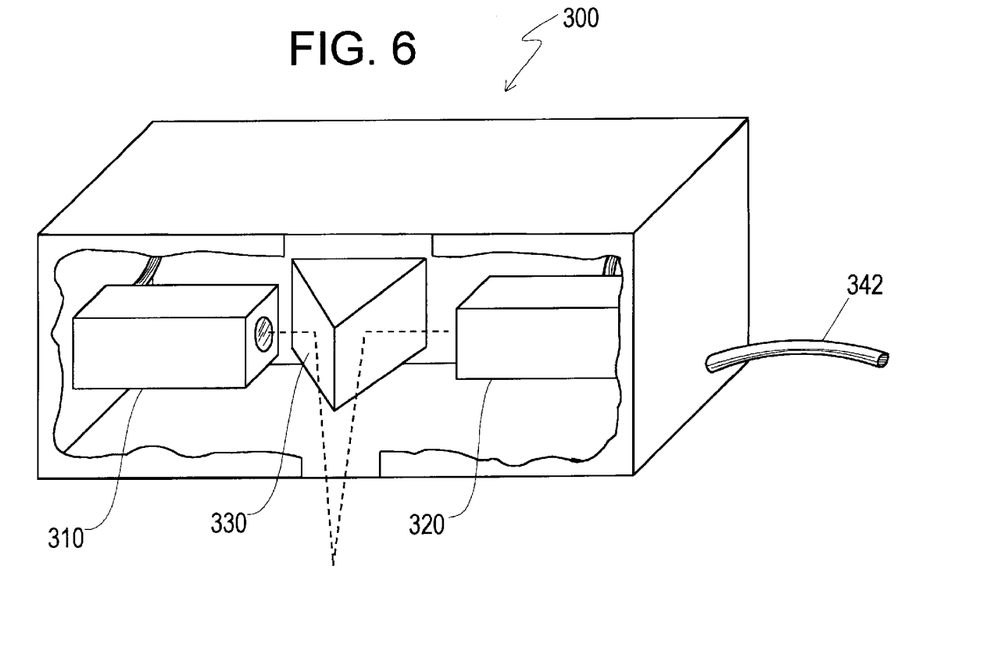
FIG. 6 is a cutaway front view of an improved infrared/optical reader.
Figure 7:
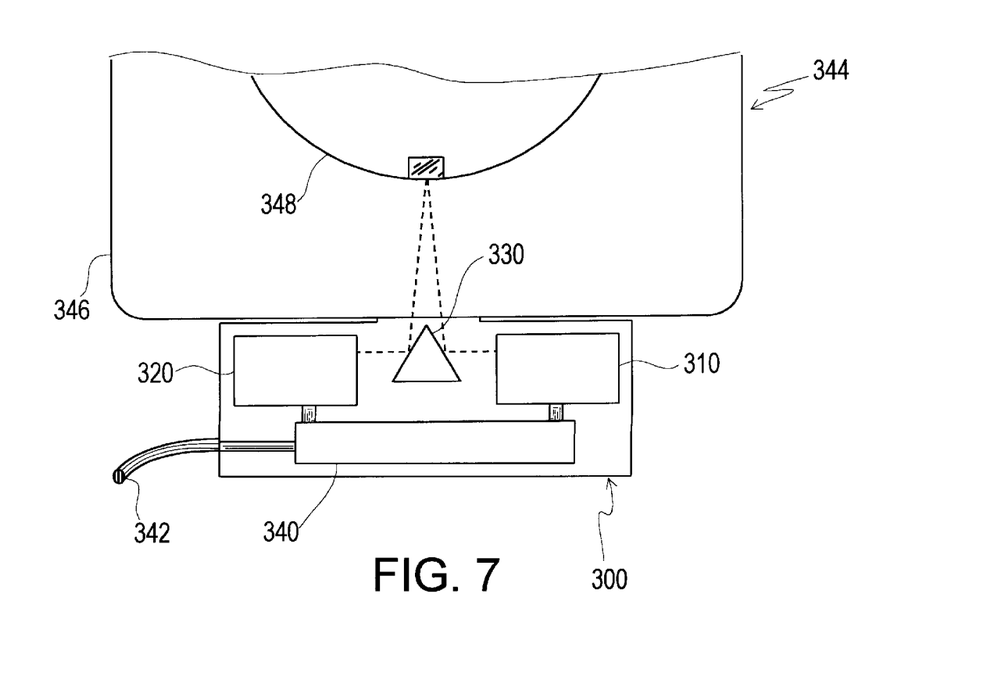
FIG. 7 is a cross section of an improved infrared/optical reader.

Referring to FIGS. 6 and 7, an improved radiation (e.g., infrared) reader 300 includes a radiation transmitter 310 and a detector 320. In one embodiment, the transmitter 310 comprises an infrared light emitting diode (LED). A device for reflecting 330 is located between the transmitter 310 and the detector 320, and optically couples the transmitter 310, the receiver 320 and a rotating utility meter disk, dial or mechanical type indicator 348. A microprocessing unit 340, used to calculate the number of rotations of the disk 348, is electrically connected to the transmitter 310 and receiver 320. In addition, preferably included within the microprocessing unit 340 is a memory for storing the processing program and collected data. A wired connection 342 may be used for transmitting from the reader 300 to the universal meter reader 120, as shown in FIG. 3. In another embodiment, the data from the microprocessor 340 may be wirelessly transmitted to the universal meter reader over an unlicensed radio frequency band. As explained earlier, the data can be transmitted from the reader 300 to the universal meter reader using an LC transmitter circuit.

In operation, reader 300 is attached to a transparent cover 346 of a utility meter 344 by an adhesive. Therefore, using the improved meter reader 300 requires no modification or alteration of existing utility meters. Additionally, the reader 300 may be used with devices that have a rotating cylinder rather than a wheel. Such rotating cylinders are found in many existing gas meters.

Also, the reader 300 may be capable of determining the usage from conventional water meters that emit a "click" or pulse when one hundred gallons have been used. In these meters, the reader 300 is capable of detecting the "click" or pulse from the meter and convert that information into water usage data.

In operation, the transmitter 310 emits a radiation (e.g., infrared) beam that strikes the reflecting device 330 and is subsequently reflected off the rotating disk 348 located in the utility meter 344 until interrupted by the dark portion once during every rotation. The beam is reflected, again, by the reflecting device 330 to the receiver 320. In a preferred embodiment, the reflecting device 330 comprises two small mirrors. When the receiver 320 detects the beam, a signal is sent to the microprocessor unit 340 by the infrared receiver 320. The microprocessor unit 340 uses this signal and a signal received from the transmitting unit 310 to calculate the number of rotations of the disk 348. This description of collection of data from a rotating disk is likewise the description of the collection of data from a dial or other mechanical indicator, except the infrared beam is reflected from the non-moving background and interrupted by the dial or change in mechanical indication. The microprocessor unit 340 also includes a memory where data and processing information are stored. Periodically or when interrogated by a remote device, the improved optical reader 300 can transmit the data to the universal meter reader 120, as shown in FIG. 4.

Additionally, a method is provided for monitoring utility usage data from a conventional utility meter having a rotatable disk. First, a beam of radiation is transmitted from a source and reflected off of the reflecting device to the rotatable disk. The beam is then reflected again off the rotatable disk back to the reflecting device where it is reflected toward an infrared detector and detected. The number of rotations of the disk is calculated from the number of times that the detector detects the infrared beam of light. The reader contains algorithms to prevent false readings caused by sunlight, other forms of optical interference or reverse meter rotation.

The foregoing discussion of the invention has been presented for purposes of illustration and description. Further, the description is not intended to limit the invention to the form disclosed herein. Consequently, variations and modifications commensurate with the above teachings, with the skill and knowledge of the relevant art, are within the scope of the present invention. The embodiment described hereinabove is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. An apparatus for transmitting data via a digital control channel of a digital wireless network, the digital wireless network including a base station controller and at least one base transceiver system associated with the base station controller, the apparatus comprising:

a universal meter reader having meter data associated therewith, the universal meter reader further having an address;

a plurality of data packets which are transmitted over the digital control channel, each of the plurality of data packets including a data packet header, wherein during conventional operation data packets are communicated from the base station controller to said at least one base transceiver system and each data packet header includes either a channel control identifier identifying its corresponding data packet as including channel control information or a dummy information identifier identifying its corresponding data packet as including dummy information;

a control channel assembler/disassembler used to monitor the data packet headers transmitted from the base station controller to the base transceiver system; and, a remote device which transmits instructions to the universal meter reader via the control channel assembler/disassembler, wherein the control channel assembler/disassembler receives an instruction from the remote device, identifies a data packet header having a dummy information identifier, replaces the dummy information included in the data packet with diverted data, and replaces the dummy information identifier with a diverted data identifier which corresponds to the address of the universal meter reader, the diverted data including the instruction to be sent to the universal meter reader from the remote device, and wherein the control channel assembler/disassembler neither creates additional packets nor increases packet traffic in the control channel.

2. The apparatus, as claimed in claim 1, wherein said digital wireless network is selected from the group consisting of a GSM technology network, a CDMA technology network, a FDMA technology network or a TDMA technology network.

3. The apparatus of claim 1 wherein the universal meter reader identifies the diverted data identifier as corresponding to the address of the universal meter reader and receives the instruction from the remote device included in the diverted data packet.

4. The apparatus of claim 3 wherein the instruction from the remote device requests the universal meter reader to send meter information from the universal meter reader to the remote device.

5. The apparatus of claim 4 wherein the requested meter information is transmitted from the universal meter reader to the remote device via the control channel and the control channel assembler/disassembler.

6. The apparatus of claim 5 wherein the meter information is transmitted from the control channel assembler/disassembler to the remote device via a telecommunications line.

7. The apparatus of claim 1 wherein the apparatus further includes a plurality of universal meter readers each having a unique address.

8. The apparatus of claim 7 wherein the remote device may request information from any one of the plurality of universal meter readers based on the unique address of each of the universal meter readers.

9. The apparatus of claim 1 wherein a meter provides meter data to the universal meter reader either by a hardwired connection between the meter and the universal meter reader or by a wireless connection between the meter and the universal meter reader.

10. The apparatus of claim 1 wherein the universal meter reader includes a wireless transceiver for transmitting data to and receiving data from the digital wireless network.

11. The apparatus of claim 1 wherein the meter data, if originally in analog form, is converted to digital form prior to being provided to the universal meter reader.

12. The apparatus of claim 1 wherein the universal meter reader includes a memory for storing meter data therein.

13. The apparatus of claim 1 wherein the meter data is time-stamped.

14. The apparatus of claim 1 wherein the control channel assembler/disassembler is located, from a communications standpoint, between the base station controller and the base transceiver system.

15. A method for transmitting data via a digital control channel of a digital wireless network, the digital wireless network including a base station controller and at least one base transceiver system associated with the base station controller, the method comprising the steps of:

providing a universal meter reader having meter data associated therewith, the universal meter reader further having an address;

transmitting a plurality of data packets over the digital control channel, each of the plurality of data packets including a data packet header, wherein during conventional operation data packets are communicated from the base station controller to said at least one base transceiver system and each data packet header includes either a channel control identifier identifying its corresponding data packet as including channel control information or a dummy information identifier identifying its corresponding data packet as including dummy information;

monitoring the data packet headers transmitted from the base station controller to the base transceiver system using a control channel assembler/disassembler; and, transmitting instructions from a remote device to the universal meter reader via the control channel assembler/disassembler and the control channel, wherein the control channel assembler/disassembler receives an instruction from the remote device, identifies a data packet header having a dummy information identifier, replaces the dummy information included in the data packet with diverted data, and replaces the dummy information identifier with a diverted data identifier which corresponds to the address of the universal meter reader, the diverted data including the instruction to be sent to the universal meter reader from the remote device, and wherein the control channel assembler/disassembler neither creates additional packets nor increases packet traffic in the control channel.

16. The method of claim 15 wherein the universal meter reader identifies the diverted data identifier as corresponding to the address of the universal meter reader and receives the instruction from the remote device included in the diverted data packet.

17. The method of claim 16 wherein the instruction from the remote device requests the universal meter reader to send meter information from the universal meter reader to the remote device.

18. The method of claim 17 wherein the requested meter information is transmitted from the universal meter reader to the remote device via the control channel and the control channel assembler/disassembler.

19. The method of claim 18 wherein the meter information is transmitted from the control channel assembler/disassembler to the remote device via a telecommunications line.

20. The method of claim 15 wherein the apparatus further includes a plurality of universal meter readers each having a unique address.

21. The method of claim 20 wherein the remote device may request information from any one of the plurality of universal meter readers based on the unique address of each of the universal meter readers.

22. The method of claim 15 wherein a meter provides meter data to the universal meter reader either by a hard-wired connection between the meter and the universal meter reader or a wireless connection between the meter and the universal meter reader.

23. The method of claim 15 wherein the universal meter reader includes a wireless transceiver for transmitting data to and receiving data from the digital wireless network.

24. The method of claim 15 wherein the meter data, if originally in analog form, is converted to digital form prior to being provided to the universal meter reader.

25. The method of claim 15 wherein the universal meter reader includes a memory for storing meter data therein.

26. The method of claim 15 wherein the meter data is time-stamped.

27. An apparatus for transmitting information using a digital control channel of a digital wireless network, wherein the network transmits information from its base station controller to its base transceiver system using data packets having either channel control information or dummy information therein while in standard mode, each of the data packets including a data packet header for identifying whether its corresponding data packet includes channel control information or dummy information, the data packet header including a channel control identifier when its corresponding data packet includes channel control information, the data packet header including a dummy information identifier when its corresponding data packet includes dummy information, the apparatus comprising:

a universal meter reader having associated meter data, the universal meter reader having an address;

a remote device which communicates with the universal meter reader via the digital wireless network;

a control channel assembler/disassembler which receives instructions from the remote device which are to be provided to the universal meter reader via the digital wireless network, the control channel assembler/disassembler being adapted to monitor the data packet headers, wherein the control channel assembler/disassembler, for at least one data packet when transmitting diverted data from the base station controller to the base transceiver system, replaces dummy information with diverted data that includes the instructions to be provided to the universal meter reader and replaces the dummy information identifier with a diverted data identifier related to the address of the universal meter reader, and wherein the control channel assembler/disassembler neither creates additional packets nor increases packet traffic in the control channel.

28. The apparatus of claim 27 wherein the base transceiver system transmits diverted data to the universal meter reader.

29. The apparatus of claim 28 wherein the universal meter reader receives the diverted data upon recognizing that the diverted data identifier corresponding with the diverted data also corresponds with the address of the universal meter reader.

* * * * *